United States Patent [19]
Oldham

[11] 4,217,464
[45] Aug. 12, 1980

[54] CABLE ANCHOR

[75] Inventor: Ronald C. Oldham, Chandlersford, England

[73] Assignee: International Standard Electric Corporation, New York, N.Y.

[21] Appl. No.: 941,088

[22] Filed: Sep. 11, 1978

[51] Int. Cl.² .......................................... H02G 15/02
[52] U.S. Cl. .................................................... 174/79
[58] Field of Search ............... 174/74 R, 79, DIG. 12

[56] References Cited
U.S. PATENT DOCUMENTS

| | | | |
|---|---|---|---|
| 2,879,321 | 3/1959 | Nilsson | 174/79 |
| 2,934,595 | 4/1960 | Earle | 174/79 X |
| 3,018,319 | 1/1962 | Quayle | 174/79 |
| 3,133,725 | 5/1964 | Lanum | 174/79 X |
| 3,932,697 | 1/1976 | Hood | 174/79 |

*Primary Examiner*—Roy N. Envall, Jr.
*Attorney, Agent, or Firm*—William T. O'Neil

[57] ABSTRACT

A submarine cable is terminated to a tail cable outside a repeater housing anchorage. A flexible shroud covers the joint and a cable stopper holds the main cable to a tear-shaped anchor member through which the tail cable passes.

1 Claim, 5 Drawing Figures

CABLE ANCHOR

BACKGROUND OF THE INVENTION

This invention relates to cable terminations and, more particularly, to the termination of a submarine cable to a repeater housing.

I have previously disclosed a cable termination in which there is provided a cone which has a circumferential radius and decreasing taper at one end and a bell mouth with an increasing radius at the other end. This facilitates in a simple manner the anchoring of the armor wires of the cable around the cone and also limits bending of the cable in the immediate vicinity of the repeater housing. In that arrangement, the armor wires are taken around the "cone" and become clamped between the cone and the annular clamping ring.

It is an object of the present invention to further simplify the anchoring arrangement while at the same time improve its reliability.

SUMMARY OF THE INVENTION

According to a principal aspect of the present invention, there is provided a cable anchor assembly for anchoring a coaxial cable to a structure. The assembly comprises a tear-shaped anchor member having a hole through it along its longitudinal axis. A surface groove extends lengthwise around the anchor member. An anchor wire is mounted in the groove. An insulating crush-resistant flexible shroud projects from the more pointed end of the anchor member, whereby the assembly can be placed over a terminated coaxial cable with the cable passing through the shroud and the anchor member and secured to the cable with the anchor wire which firmly embraces the cable, the anchor member being securable to the structure.

This arrangement is less expensive than my prior cable anchor assembly, and has increased flexibility at the anchorage point.

DESCRIPTION OF THE PREFERRED EMBODIMENT

Figure 1:
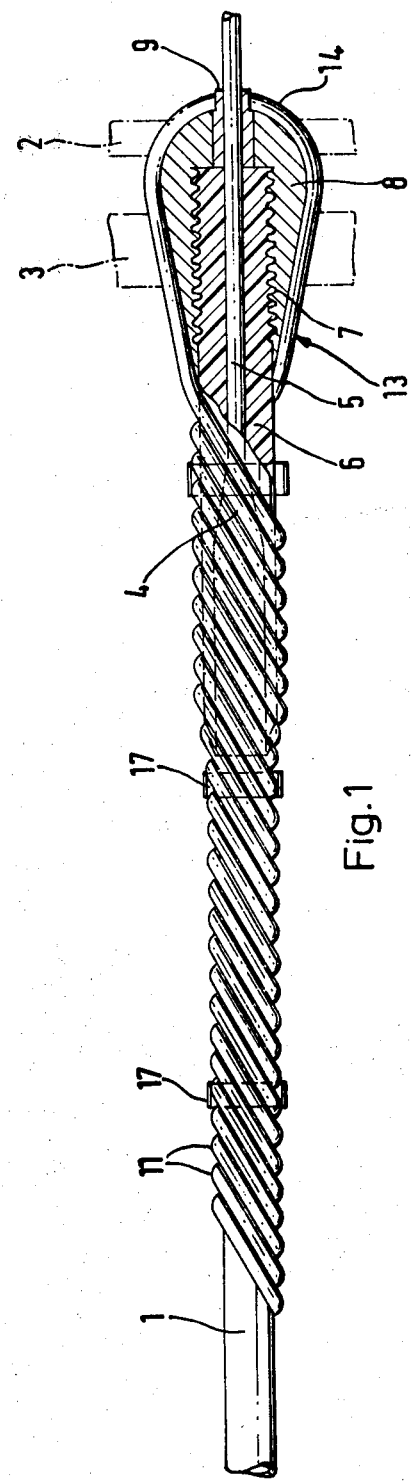
FIG. 1 shows in partial longitudinal cross-section, a cable termination according to an embodiment of the invention.

Referring now to FIG. 1 of the drawings in detail, a lightweight submarine coaxial cable 1 is anchored to clamping plates 2 and 3. Plates 2 can be secured to a submarine repeater housing (not shown). At a distance from the clamping pates, the coaxial cable 1 is electrically terminated as indicated at 4 and connected with a smaller more flexible waterproof coaxial cable 5 which extends into the repeater housing via a watertight bulkhead (all not shown).

The cable 5 and the termination 4 are shrouded in a polythene shroud 6 which is bonded to an internal recess 7 in a tear-shaped anchoring cone 8. The recess is in the form of a stepped bore, the smaller part 8a of which houses a protective bush 9.

The coaxial cable 1 has a central strength member 10 (FIG. 2) and the tensile strain in the cable is transferred from the central strength member 10 to external wires 11. These wires are laid around the outer plastic sheath of the cable 1 and extend around the tear-shaped cone 8 in a lengthwise extending surface groove 12 formed thereon (FIG. 3). The wires are in the form of a cable stopper 13 (FIG. 4a) with the looped end 14 placed over the cone 8 and the preformed limbs criss-crossing (FIG. 4b) over the termination 4 and back along the cable. This cable stopper effectively grips and clamps the sheath and prevents it slipping so that tensile forces in the coaxial cable 1 are transferred to the cone 8. A plurality of cable stoppers may be used if desired.

Figure 2:
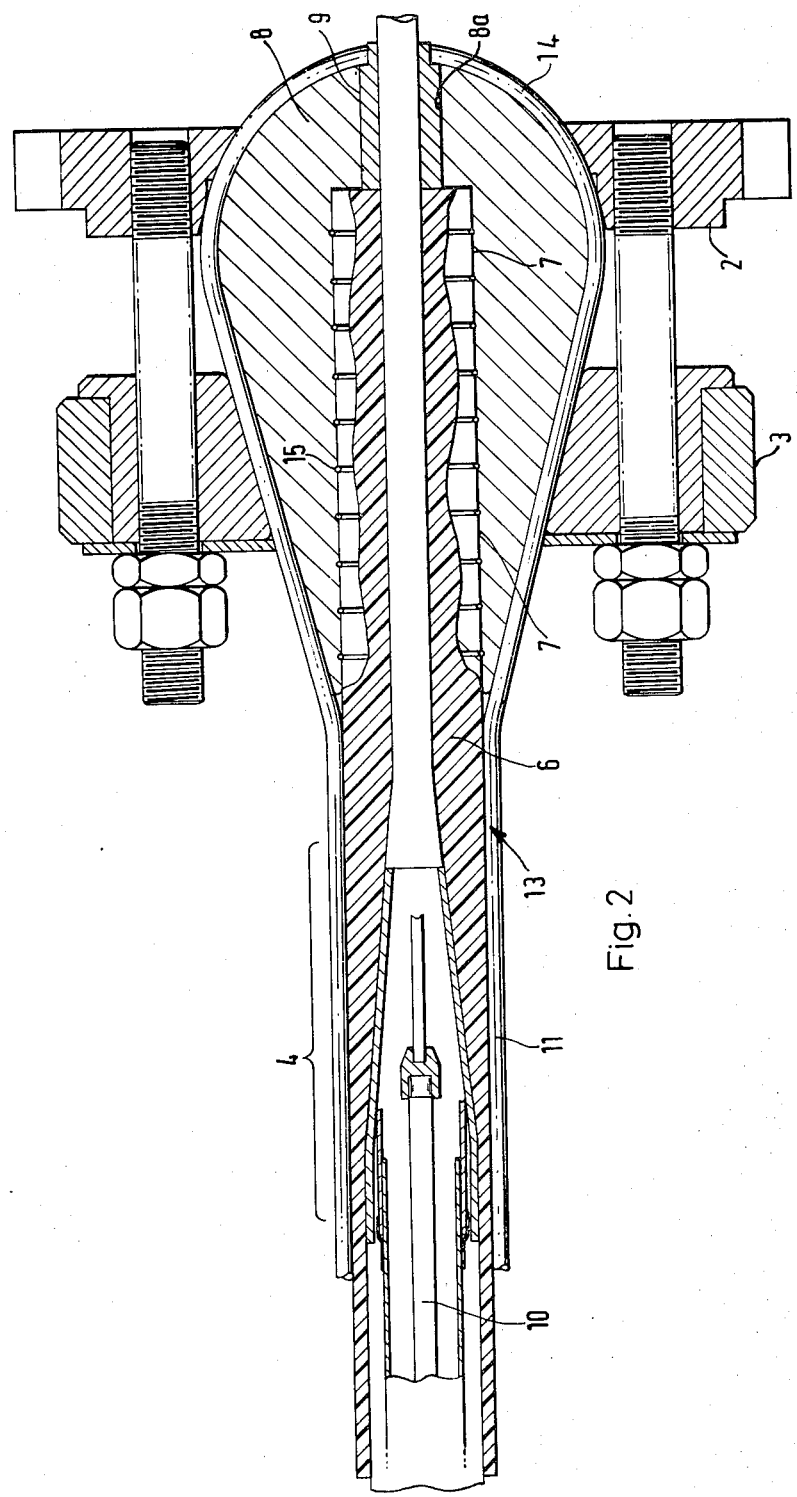
FIG. 2 shows, on an enlarged scale and in longitudinal cross-section, part of the embodiment of the FIG. 1.
Figure 3:
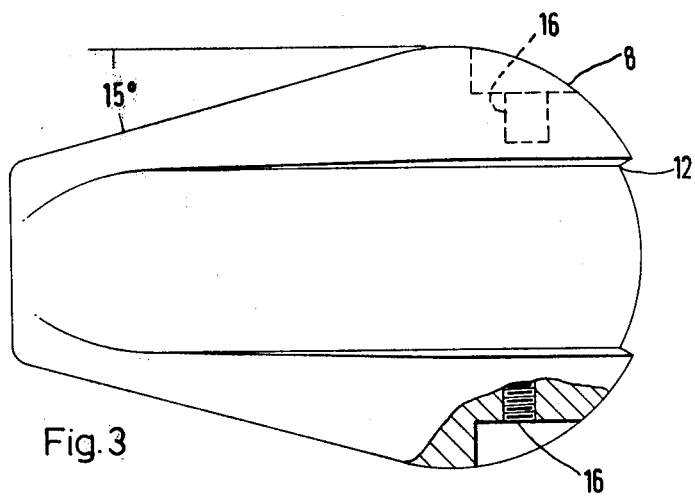
FIG. 3 is a top plan view of the tear-shaped anchor member used in the termination of FIGS. 1 and 2.
Figure 4A:
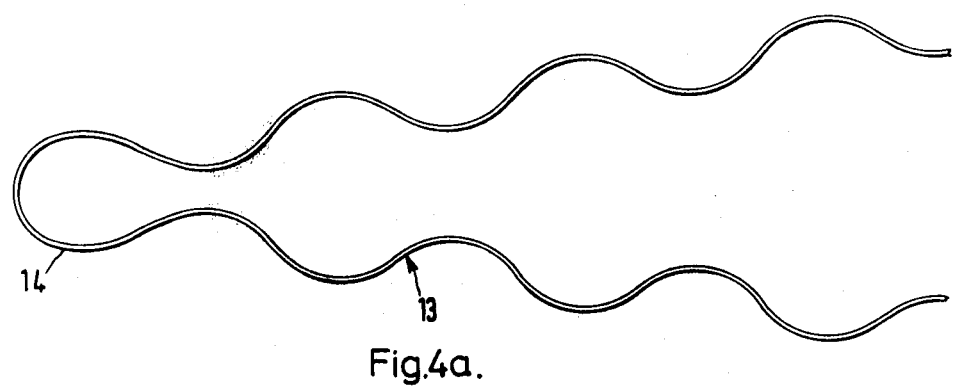
FIGS. 4a and 4b show the anchor wire used in the termination of FIGS. 1 and 2.
Figure 4B:
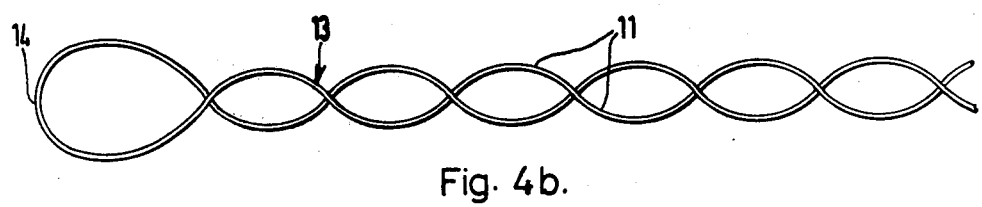

Referring to FIG. 2 of the drawings in detail, the shroud 6 is boneded into the recess 7 of the cone 8 by means of epoxy rein and circumferential grooves such as 15 in the cone and in the shroud assist the epoxy resin locking the shroud to the cone. FIG. 3 shows in greater detail the cone 8 and the groove 12 in which are located the armor wires 11 and the end loop 14 of the or each cable stopper. Bores such as 16 in opposite sides of the cone are provided in order that when the cable is attached to the cone, the assembly can be hauled into position.

It should be pointed out that the distance between the beginning of the taper on the termination 4 and the neck of the cone 8 would be of the order of 6 inches or more and that portion of cable will be more flexible than the lightweight cable proper on the other side of the termination. It is also pointed out that the showing in the drawing of the cable stopper wire 13 is in simplified form. In practice, there would be eight such wires bonded together along their length except for the bit or loop portion 14. These wires are sprayed and bonded with neoprene and carborundum grit embedded in the neoprene in order to ensure maximum grip. The stopper can be applied to the cable by holding the parted end limbs 13 and snapping them over the cable. This normally requires two men and the normal length of a cable stopper is approximately 9 feet.

Referring again to FIG. 2 of the drawings, the steps in the termination procedure are as follows. Firstly, the cone 8 is provided. This can be machined from solid material, or cast or forged to the required shape. Then from a solid rod or bar of polythene, the polythene shroud 6 is machined and this is then bonded into the cone by means of epoxy resin. Then the cone with the shroud bonded to it is introduced into the eye or loop 14 of the cable stopper 13 and the limbs 11 of the cable stopper are separated. The shroud is then positioned over the termination 4 and the small diameter coaxial cable 5 is threaded through the cone. Then the limbs of the cable stopper are snapped back over the cable and are secured at intervals with "bandit" strapping 17 or other circular clamping devices.

It is to be noted that the polythene shroud 6 protects the termination from being crushed by the cable stopper 13 which clamps the shroud and the cable sheath tightly.

What is claimed is:

1. A cable anchor assembly for anchoring a coaxial cable to a structure comprising:
   a tear-shaped anchor cone having a hole through it along its longitudinal axis;
   a surface groove extending lengthwise around said anchor cone;
   an anchor wire mounted in said groove; and a crush-resistant flexible shroud of insulating material projecting from the more pointed end of said anchor cone, whereby the assembly can be placed over a terminated coaxial cable with the cable passing through said shroud and said anchor cone and secured to the cable with said anchor wire which firmly embraces the cable.

* * * * *